(12) United States Patent
Liu et al.

(10) Patent No.: US 11,675,827 B2
(45) Date of Patent: Jun. 13, 2023

(54) MULTIMEDIA FILE CATEGORIZING, INFORMATION PROCESSING, AND MODEL TRAINING METHOD, SYSTEM, AND DEVICE

(71) Applicant: Alibaba Group Holding Limited, Grand Cayman (KY)

(72) Inventors: Mengyi Liu, Hangzhou (CN); Xiaowei Zhao, Hangzhou (CN); Zhu Liu, Bellevue, WA (US)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 210 days.

(21) Appl. No.: 16/919,160

(22) Filed: Jul. 2, 2020

(65) Prior Publication Data

US 2021/0011941 A1  Jan. 14, 2021

(30) Foreign Application Priority Data

Jul. 14, 2019  (CN) .......................... 201910632609.3

(51) Int. Cl.
| | |
|---|---|
| *G06F 16/45* | (2019.01) |
| *G06N 20/00* | (2019.01) |
| *G06F 40/30* | (2020.01) |
| *G06F 17/18* | (2006.01) |

(52) U.S. Cl.
CPC .............. *G06F 16/45* (2019.01); *G06F 17/18* (2013.01); *G06F 40/30* (2020.01); *G06N 20/00* (2019.01)

(58) Field of Classification Search
CPC ..................................................... G06F 16/45
USPC ........................................................ 707/736
See application file for complete search history.

(56) References Cited

U.S. PATENT DOCUMENTS

| | | | |
|---|---|---|---|
| 7,117,231 | B2 | 10/2006 | Fischer et al. |
| 7,607,097 | B2 | 10/2009 | Janakiraman et al. |
| 8,825,489 | B2 | 9/2014 | Scoggins et al. |
| 9,489,577 | B2 | 11/2016 | Wilde |
| 9,812,028 | B1 | 11/2017 | Elchik et al. |
| 10,209,974 | B1 * | 2/2019 | Patton ....................... G06F 8/60 |
| 10,304,458 | B1 | 5/2019 | Woo |
| 2005/0286865 | A1 | 12/2005 | Dorai et al. |

(Continued)

*Primary Examiner* — Kimberly L Wilson
(74) *Attorney, Agent, or Firm* — James J. DeCarlo; Greenberg Traurig, LLP

(57) ABSTRACT

Disclosed embodiments provide a multimedia file categorizing, information processing, and model training method, system, and device. The method comprises determining a plurality of feature combinations according to respective feature sets corresponding to at least two types of modality information in a multimedia file; determining a semantically relevant feature combination by using a first computational model according to the plurality of feature combinations; and categorizing the multimedia file by using the first computational model with reference to the semantically relevant feature combination. The technical solutions provided by the disclosed embodiments identify a semantically relevant feature combination in a process of categorizing a multimedia file by synthesizing features corresponding to a plurality of modalities of the multimedia file. The semantically relevant feature combination has a stronger expression capability and higher value. Categorizing the multimedia file by using this feature combination can effectively improve the categorization accuracy of the multimedia file.

16 Claims, 11 Drawing Sheets

Determine a plurality of sample feature combinations according to respective sample feature sets corresponding to at least two types of modality information in a sample multimedia file — 201

Determine a semantically-relevant sample feature combination by using a first computational model according to the plurality of sample feature combinations — 202

Optimize the first computational model with reference to a degree of semantic relevance of the semantically-relevant sample feature combination — 203

(56) References Cited

U.S. PATENT DOCUMENTS

| | | |
|---|---|---|
| 2007/0011012 A1 | 1/2007 | Yurick et al. |
| 2007/0185857 A1 | 8/2007 | Kienzle et al. |
| 2011/0093263 A1 | 4/2011 | Mowzoon |
| 2014/0003787 A1 | 1/2014 | Hejna, Jr. |
| 2016/0014482 A1 | 1/2016 | Chen et al. |
| 2016/0110433 A1* | 4/2016 | Sawhney ............ G06F 16/9535 707/722 |
| 2017/0091556 A1 | 3/2017 | Neumann et al. |
| 2017/0105051 A1 | 4/2017 | Deo et al. |
| 2017/0213469 A1 | 7/2017 | Elchik et al. |
| 2018/0032845 A1* | 2/2018 | Polak .................... G06V 20/41 |
| 2018/0061256 A1 | 3/2018 | Elchik et al. |
| 2018/0075139 A1 | 3/2018 | Sadovsky |
| 2018/0082124 A1 | 3/2018 | Zhang et al. |
| 2018/0160200 A1 | 6/2018 | Goel et al. |
| 2019/0318198 A1* | 10/2019 | Griffin ................ G06K 9/6254 |
| 2020/0143169 A1* | 5/2020 | Vaezi Joze ........... G06K 9/6271 |

\* cited by examiner

MULTIMEDIA FILE CATEGORIZING, INFORMATION PROCESSING, AND MODEL TRAINING METHOD, SYSTEM, AND DEVICE

CROSS-REFERENCE TO RELATED APPLICATION

This application claims the benefit of priority of Chinese Application No. 201910632609.3, filed on Jul. 14, 2019 which is hereby incorporated by reference in its entirety.

BACKGROUND

Technical Field

The disclosed embodiments relate to the field of computer application technologies, and in particular, to a multimedia file categorizing, information processing, and model-training method, system, and device.

Description of the Related Art

Content-based video categorization is an important technology in data processing and distribution on multimedia platforms.

Currently, most video categorization technologies categorize videos by using categorization models that rely on a single modality (i.e., based on only image modality data). This approach completely discards data of other modalities (e.g., data of text or voice modality or the like, contained in multimedia video files) and results in low video categorization accuracy in existing models. Consequently, existing approaches negatively impact the effects of data processing and distribution on the multimedia platforms.

SUMMARY

In view of the above deficiencies, the disclosed embodiments provide a multimedia file categorizing, information processing, and model training method, system, and device that solve, or at least partially solve, the above deficiencies.

In one embodiment, a multimedia file categorizing method is provided. The method includes determining a plurality of feature combinations according to respective feature sets corresponding to at least two types of modality information in a multimedia file, where a plurality of features constituting the feature combinations are selected from feature sets corresponding to different modality information; determining a semantically relevant feature combination by using a first computational model according to the plurality of feature combinations; and categorizing the multimedia file by using the first computational model with reference to the semantically relevant feature combination, where the multimedia file includes a plurality of types of modality information, and the plurality of types of modality information include at least two of modalities selected from the group consisting of a text modality, an image modality, and a voice modality.

In another embodiment, an information processing method is provided. The method includes determining a plurality of feature combinations according to respective feature sets corresponding to at least two types of modality information in a multimedia file, where a plurality of features constituting the feature combinations are selected from feature sets corresponding to different modality information; and determining a semantically relevant feature combination by using a first computational model according to the plurality of feature combinations, where the multimedia file includes a plurality of types of modality information, and the plurality of types of modality information include at least two of modalities selected from the group consisting of a text modality, an image modality, and a voice modality.

In another embodiment, a model training method is provided. The method includes determining a plurality of sample feature combinations according to respective sample feature sets corresponding to at least two types of modality information in a sample multimedia file, where a plurality of sample features constituting the sample feature combinations are from sample feature sets corresponding to different modality information; determining a semantically relevant sample feature combination by using a first computational model according to the plurality of sample feature combinations; and optimizing the first computational model with reference to a degree of semantic relevance of the semantically relevant sample feature combination, where the sample multimedia file comprises a plurality of types of modality information, and the plurality of types of modality information include at least two of modalities selected from the group consisting of a text modality, an image modality, and a voice modality; and the first computational model is configured to identify a target multimedia file.

In another embodiment, an information processing method is provided. The method includes determining a video category preferred by a target user; querying for a target video file in a query library according to the video category preferred by the target user, where a correspondence between each video file in a plurality of video files and a video category associated with the video file is stored in the query library; and sending the target video file to the target user, where the method further includes: determining a plurality of feature combinations according to respective feature sets corresponding to at least two types of modality information in the video files, where a plurality of features constituting the feature combinations are selected from feature sets corresponding to different modality information; determining a semantically relevant feature combination by using a first computational model according to the plurality of feature combinations; and categorizing the video files by using the first computational model with reference to the semantically relevant feature combination so as to obtain video categories to which the video files belong, where the video files are constituted by a plurality of types of modality information, and the plurality of types of modality information include at least one type of modality information in a text modality and a voice modality, and image modality information.

In another embodiment, an information processing method is provided. The method includes determining, according to query information inputted by a user, a video category to be queried; querying for a target video file in a query library according to the video category to be queried, where a correspondence between each video file in a plurality of video files and a video category associated with the video file is stored in the query library; and sending the target video file as a query result to the user, where the method further includes: determining a plurality of feature combinations according to respective feature sets corresponding to at least two types of modality information in the video files, where a plurality of features constituting the feature combinations are selected from feature sets corresponding to different modality information; determining a semantically relevant feature combination by using a first computational model according to the plurality of feature combinations; and categorizing the video files by using the first computational model with reference to the semantically relevant feature combination so as to obtain video categories to which the video files belong, where the video files are constituted by a plurality of types of modality information, and the plurality of types of modality information include at least one type of modality information in a text modality and a voice modality, and image modality information.

In another embodiment, a neural network system is provided. The neural network system includes a determining module, configured to determine a plurality of feature combinations according to respective feature sets corresponding to at least two types of modality information in a multimedia file, where a plurality of features constituting the feature combinations are selected from feature sets corresponding to different modality information; and at least one first network layer, configured to determine a semantically relevant feature combination according to the plurality of feature combinations, where the multimedia file includes a plurality of types of modality information, and the plurality of types of modality information include at least two of modalities selected from the group consisting of a text modality, an image modality, and a voice modality.

In another embodiment, an electronic device is provided. The electronic device includes a memory and a processor, where the memory is configured to store a program; and the processor is coupled to the memory and configured to execute the program stored in the memory, so as to determine a plurality of feature combinations according to respective feature sets corresponding to at least two types of modality information in a multimedia file, where a plurality of features constituting the feature combinations are selected from feature sets corresponding to different modality information; determine a semantically relevant feature combination by using a first computational model according to the plurality of feature combinations; and categorize the multimedia file by using the first computational model with reference to the semantically relevant feature combination, where the multimedia file includes a plurality of types of modality information, and the plurality of types of modality information include at least two of modalities selected from the group consisting of a text modality, an image modality, and a voice modality.

In another embodiment, an electronic device is provided. The electronic device includes a memory and a processor, where the memory is configured to store a program; and the processor is coupled to the memory and configured to execute the program stored in the memory, so as to determine a plurality of feature combinations according to respective feature sets corresponding to at least two types of modality information in a multimedia file, where a plurality of features constituting the feature combinations are selected from feature sets corresponding to different modality information; and determine a semantically relevant feature combination by using a first computational model according to the plurality of feature combinations, where the multimedia file includes a plurality of types of modality information, and the plurality of types of modality information include at least two of modalities selected from the group consisting of a text modality, an image modality, and a voice modality.

In another embodiment, an electronic device is provided. The electronic device includes a memory and a processor, where the memory is configured to store a program; and the processor is coupled to the memory and configured to execute the program stored in the memory, so as to determine a plurality of sample feature combinations according to respective sample feature sets corresponding to at least two types of modality information in a sample multimedia file, where a plurality of sample features constituting the sample feature combinations are from sample feature sets corresponding to different modality information; determine a semantically relevant sample feature combination by using a first computational model according to the plurality of sample feature combinations; and optimize the first computational model with reference to a degree of semantic relevance of the semantically relevant sample feature combination, where the sample multimedia file comprises a plurality of types of modality information, and the plurality of types of modality information include at least two of modalities selected from the group consisting of a text modality, an image modality, and a voice modality; and the first computational model is configured to identify a multimedia file.

The technical solutions provided by the disclosed embodiments identify a semantically relevant feature combination in a process of categorizing a multimedia file by synthesizing features corresponding to a plurality of modalities of the multimedia file. The semantically relevant feature combination has a stronger expression capability and higher value. Categorizing the multimedia file by using this feature combination can effectively improve the categorization accuracy of the multimedia file.

BRIEF DESCRIPTION OF THE DRAWINGS

In order to illustrate technical solutions in disclosed embodiments or in the prior art more clearly, accompanying drawings required to be used in the embodiments or the prior art are introduced below. The accompanying drawings in the following description are some of the disclosed embodiments. For those of ordinary skill in the art, other accompanying drawings can further be obtained according to these accompanying drawings without any creative efforts.

DETAILED DESCRIPTION

Figure 1:
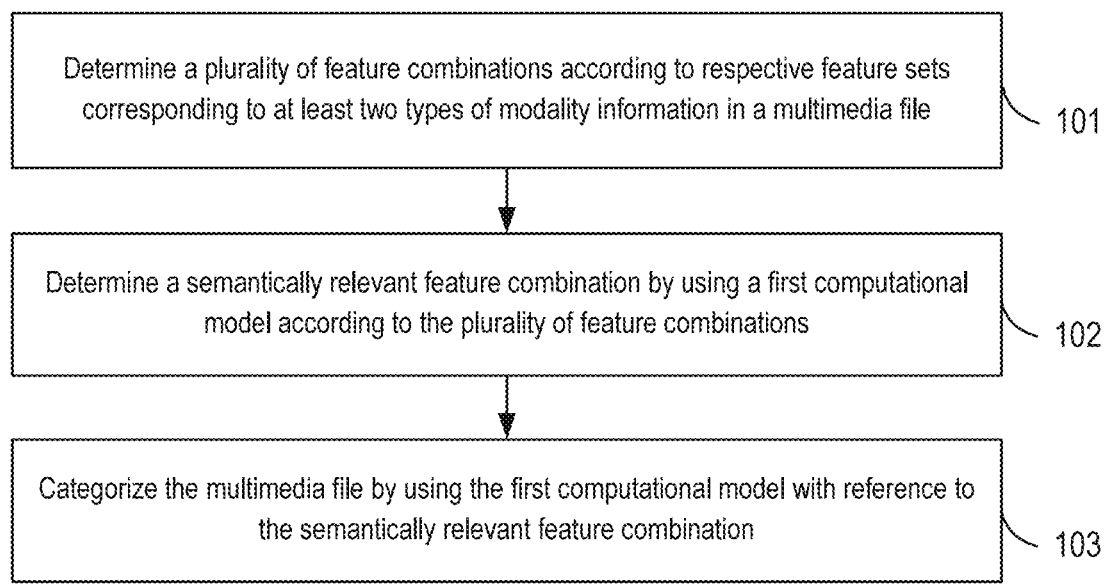
FIG. 1 is a flow diagram of a method for categorizing a multimedia file according to some embodiments of the disclosure.

During the implementation of the technical solutions of the disclosed embodiments, the inventors found that if feature sequences corresponding to various pieces of modality information in a plurality of pieces of modality information of a multimedia file are subjected to feature aggregation respectively via a feature sequence aggregation model, an aggregated feature corresponding to each piece of modality information is obtained, and then the multimedia file is categorized by synthesizing the aggregated features corresponding to the pieces of modality information in the plurality of pieces of modality information. This strategy discards interaction of the plurality of pieces of modality information in the entire temporal dimension, resulting in the underutilization of valuable feature combinations at certain time nodes.

If features are correspondingly combined according to respective temporal sequences of the plurality of pieces of modality information (i.e., the order of video frames in image modality information, the order of text words in text modality data, and the order of audio frames in voice modality information), a fused feature can be obtained at each time node, so a sequence can be finally obtained. The sequence is inputted to an aggregation model, and then the video is categorized. Although this strategy considers interaction of two pieces of modality information in the entire temporal dimension, it ignores the problem of semantic misalignment of different modality information in the temporal sequence. The combination of two semantically irrelevant features will damage the expression capability of the original features, and consequently affect the final performance.

For example, video files have natural multi-modality (image, text, voice, etc.) attributes, different modality information is in an unstructured form, and it is difficult to perform semantic alignment between sequences. For example, for a video and its corresponding text description, objects appearing in the first few frames of the video may appear in the second half of the text description, and a combination based directly on the respective orders in which the video frames and the text words appear will result in irrelevant semantic meanings or semantic conflicts, and consequently damage the expression capability of the original features.

In order to solve the above problems, the inventor proposes to identify semantically relevant features for a combination, so as to generate features with a stronger expression capability for categorization, which can effectively improve the categorization accuracy.

In order to enable those skilled in the art to better understand the solutions of the disclosed embodiments, the technical solutions in the disclosed embodiments will be described clearly and completely, with reference to the accompanying drawings in the disclosed embodiments. The described embodiments are only a part of the disclosed embodiments, but not all the embodiments. Based on the embodiments in the present application, all other embodiments obtained by those skilled in the art without creative efforts fall within the scope of the present application.

In addition, some processes described in the description, claims, and above accompanying drawings of the present application include a plurality of operations that appear in a specific order. These operations may be performed in an order other than that appeared herein or may be performed in parallel. Sequence numbers of the operations (e.g., 101, 102, etc.) are only used to distinguish different operations, and the sequence numbers themselves do not represent any required execution order. In addition, these processes may include more or fewer operations, and these operations may be performed in sequence or in parallel. It should be noted that the descriptions such as "first" and "second" herein are used to distinguish different messages, devices, modules, etc., and do not represent a sequential order, nor limit "first" and "second" as different types.

FIG. 1 is a flow diagram of a method for categorizing a multimedia file according to some embodiments of the disclosure. As shown in FIG. 1, the method includes the following steps.

Step 101. Determine a plurality of feature combinations according to respective feature sets corresponding to at least two types of modality information in a multimedia file.

Step 102. Determine a semantically relevant feature combination by using a first computational model according to the plurality of feature combinations.

Step 103. Categorize the multimedia file by using the first computational model with reference to the semantically relevant feature combination.

A plurality of features constituting the feature combinations are selected from feature sets corresponding to different modality information.

In the above step 101, the multimedia file comprises a plurality of types of modality information, and the plurality of types of modality information include at least two of modalities selected from the group consisting of a text modality, an image modality, and a voice modality. For example, when the multimedia file is a video file, the multimedia file includes image modality information, and may also include text modality information and/or voice modality information. For another example, when the multimedia file is an audio file, the multimedia file includes voice modality information and text modality information. The image modality information includes a sequence of video frames, the text modality information includes a sequence of text words, and the voice modality information includes a sequence of audio frames.

The respective feature sets corresponding to the at least two types of modality information above each include a plurality of features. In an example, a specific form of the features may be vectors.

For example, the feature set corresponding to the image modality information includes a plurality of video frame features; the feature set corresponding to the text modality information includes a plurality of text word features; and the feature set corresponding to the voice modality information includes a plurality of audio frame features. Each video frame feature is used to describe its corresponding video frame; each text word feature is used to describe its corresponding text word; and each audio frame feature is used to describe its corresponding audio frame. In an example, a plurality of features in the feature set corresponding to each piece of modality information can form a corresponding feature sequence according to a temporal relationship.

The plurality of feature combinations may be obtained by sampling from the respective feature sets corresponding to the at least two types of modality information, respectively. Specifically, the respective feature sets corresponding to the at least two types of modality information can be sampled respectively in a temporal or random sampling manner to obtain the plurality of feature combinations. Sampling in a temporal sequence may be performed according to a temporal sequence corresponding to one type of modality information in the at least two types of modality information.

For example, the multimedia file includes Q video frames arranged in sequence (i.e., Q video frames arranged in a temporal sequence) and P text words arranged in sequence. Correspondingly, the feature set corresponding to the image modality information includes Q video frame features arranged in sequence, and the feature set corresponding to the text modality information includes P text word features arranged in sequence. Sampling may be performed according to the temporal sequence corresponding to the image modality information. Specifically, during a first sampling, a video frame feature arranged first is selected from the Q video frame features according to the temporal sequence, and then a text feature is randomly selected from the P text word features and combined with the video frame feature arranged first to obtain a first feature combination. During a second sampling, a video frame feature arranged second is selected from the Q video frame features according to the temporal sequence, and then a text feature is randomly selected from the P text word features and combined with the second video frame feature to obtain a second feature combination, and so on, until the number of sampling times reaches a maximum number of sampling times, and the sampling is stopped. It may be supplemented that if the sampling is performed according to the temporal sequence, the maximum number of sampling times is equal to or less than the above Q.

In one embodiment, in the process of random sampling, each sampling randomly selects a feature from the respective feature sets corresponding to the at least two types of modality information for combination until the number of sampling times reaches the maximum number of sampling times, and the sampling is stopped.

In some embodiments, the maximum number of sampling times may be set according to actual needs, which is not specifically limited in this embodiment. The feature combination obtained by each sampling may be regarded as a "state" of a time node.

A method for determining a feature combination will be introduced below. The plurality of feature combinations includes a third feature combination. The third feature combination refers to any feature combination in the plurality of feature combinations. In this scenario, step 101 may include the following steps.

Step 1011. Respectively select, by means of sampling, a feature from each feature set in the respective feature sets corresponding to the at least two types of modality information.

Step 1012. Linearly map the feature selected from each feature set to obtain a plurality of features of the same dimensionality.

Step 1013. Combine the plurality of features of the same dimensions into the third feature combination.

In the above step 1011, a feature may be respectively selected from each feature set in the respective feature sets corresponding to the at least two types of modality information in the temporal or random sampling manner described above.

In the above step 1012, in order to facilitate subsequent fusion of a plurality of features constituting the first feature combination to obtain a first fused feature, it may be necessary to ensure that the plurality of first features constituting the first feature combination have the same dimensionality.

Considering that the dimensionalities of the features in each feature set may be different, the feature selected from each feature set is linearly mapped to obtain a plurality of features having the same dimensionality. The linear mapping processing of each feature in each feature set may be implemented using a corresponding fourth fully connected layer in the first computational model described below. Specifically, the feature sets corresponding to the plurality of modalities include a first feature set and a second feature set.

The dimensionality of features in the first feature set is five (5), and the dimensionality of features in the second feature set is four (4). The number of channels in the fourth fully connected layer corresponding to the first feature set is four (4), and the number of channels in the fourth fully connected layer corresponding to the second feature set is four (4). After the features in the first feature set are linearly mapped by the fourth fully connected layer corresponding to the first feature set, a four-dimensional feature vector is obtained, and after the features in the second feature set are linearly mapped by the fourth fully connected layer corresponding to the second feature set, a four-dimensional feature vector is also obtained.

In the above step 102 of FIG. 1, a plurality of features constituting the semantically relevant feature combination are selected from feature sets corresponding to different modality information. The first computational model may be obtained by training according to sample training data in advance. In one embodiment, the first computational model may be a neural network model.

In one embodiment, the plurality of feature combinations may be screened by using an attention mechanism of the first computational model, to obtain the semantically relevant feature combination. Specifically, respective selected probabilities corresponding to the plurality of feature combinations are calculated using the attention mechanism of the first computational model and the semantically relevant feature combination is selected from the plurality of feature combinations according to the respective selected probabilities corresponding to the plurality of feature combinations. For example, a feature combination with a selected probability greater than a preset threshold may be used as the semantically relevant feature combination.

The attention mechanism is derived from studies on human vision. In cognitive science, due to the bottleneck of information, humans will selectively focus on part of all information while ignoring other visible information. Plainly speaking, the attention mechanism is to focus attention on important information and ignore other unimportant information.

In the above step 103, a second fused feature may be obtained according to a plurality of second features constituting the semantically relevant feature combination; and the multimedia file is categorized using the first computational model according to the second fused feature.

In one embodiment, the obtaining a second fused feature according to a plurality of second features constituting the semantically relevant feature combination comprises splicing the plurality of second features to obtain the second fused feature or adding the plurality of second features on an element basis to obtain the second fused feature.

The categorization of the multimedia file may be a binary categorization or multiple categorization. Using multiple categorization as an example, the first computational model can predict, with reference to the semantically relevant feature combination, probabilities of the multimedia file belonging to categories in a plurality of categories, and can predict, according to the probabilities of the multimedia file belonging to the categories in the plurality of categories, a category to which the multimedia file belongs. The definitions of the categories can be determined according to actual service scenarios. For example, the plurality of categories may include objects, scenarios, character behaviors, events, etc. that appear in the multimedia file.

The technical solution provided in this embodiment identifies a semantically relevant feature combination in a process of categorizing a multimedia file by synthesizing features corresponding to a plurality of modalities of the multimedia file. The semantically relevant feature combination has a stronger expression capability and higher value. Categorizing the multimedia file by using this feature combination can effectively improve the categorization accuracy of the multimedia file.

In another embodiment, the above step 102 may comprise the following steps.

Step 1021. Determine, by using an attention mechanism of the first computational model, attention features corresponding to the first feature combination from a plurality of first features constituting the first feature combination.

Step 1022. When the number of the attention features corresponding to the first feature combination is greater than a first preset threshold, combine the attention features corresponding to the first feature combination to obtain the semantically relevant feature combination.

The plurality of feature combinations includes the first feature combination. The first feature combination refers to any feature combination among the plurality of feature combinations.

In the above step 1021, the attention features corresponding to the first feature combination are determined using the attention mechanism of the first computational model from the plurality of first features constituting the first feature combination. That is, features that need to be selected (i.e., focused on) and features that need to be ignored are determined from the plurality of first features constituting the first feature combination. The features that need to be selected are the attention features.

In an example, the above step 1021 may comprise the following steps.

Step S11a. Fuse the plurality of first features to obtain a first fused feature.

Step S12a. Calculate, by using the first computational model according to the first fused feature, respective probabilities corresponding to a plurality of possible selected results corresponding to the plurality of first features.

Step S13a. Determine a target selected result according to the respective probabilities corresponding to the plurality of possible selected results.

Step S14a. Determine, according to the target selected result, the attention features corresponding to the first feature combination.

In the above step S11a, the plurality of first features may be fused using one or a plurality of the following manners.

Manner 1: Splice the plurality of first features to obtain the first fused feature.

For example, the plurality of first features include a feature A (a1, a2, a3) and a feature B (b1, b2, b3), and the feature A and the feature B are spliced to obtain a first fused feature C (a1, a2, a3, b1, b2, b3).

Manner 2: Add the plurality of first features on an element basis to obtain the first fused feature.

For example, the plurality of first features include a feature A (a1, a2, a3) and a feature B (b1, b2, b3), and the feature A and the feature B are added on an element basis to obtain a first fused feature C (a1+b1, a2+b2, a3+b3).

Manner 3: Multiply the plurality of first features on an element basis to obtain the first fused feature.

For example, the plurality of first features include a feature A (a1, a2, a3) and a feature B (b1, b2, b3), and the feature A and the feature B are multiplied on an element basis to obtain a first fused feature C (a1*b1, a2*b2, a3*b3).

In the above step S12a, the plurality of possible selected results corresponding to the plurality of first features include a result that all of the plurality of first features are selected, various results that some features in the plurality of first features are selected, and a result that the plurality of first features are not selected.

For example, if the plurality of first features include video frame features and text word features, the plurality of possible selected results corresponding to the plurality of first features include: a result that neither the video frame features nor the text word features are selected (i.e., a 00 mode result, where the first digit indicates whether the video frame features are selected, the second digit indicates whether the text word features are selected, 0 represents being not selected, and 1 represents being selected); a result that the video frame features are not selected and the text word features are selected (i.e., a 01 mode result); a result that the video frame features are selected and the text word features are not selected (i.e., a 10 mode result); and a result that the video frame features are selected and the text word features are selected (i.e., a 11 mode result).

In one embodiment, each feature in the plurality of first features has two possibilities of being selected and not being selected. The above method may further include determining, according to the two possibilities of being selected and not being selected possessed by each feature in the plurality of first features, the plurality of possible selected results corresponding to the plurality of first features. The number of the plurality of first features is n, and the number of the plurality of possible selected results is 2n. For example, when the number of the plurality of first features is 2, the number of the plurality of possible selected results is 4.

In one embodiment, the above step S12a may specifically be implemented by using the following steps. Using the first fused feature as an input of a first fully connected layer in the first computational model to obtain a first vector outputted by the first fully connected layer; using the first vector as an input of a first normalization layer in the first computational model to obtain a second vector outputted by the first normalization layer; and determining, according to the second vector, the respective probabilities corresponding to the plurality of possible selected results. The number of channels of the first fully connected layer is consistent with the number of the plurality of possible selected results. The dimensionality of the first vector and the dimensionality of the second vector are consistent with the number of the plurality of possible selected results. Each element value in the second vector is a probability corresponding to a possible selected result.

For example, following the above example, the second vector may be (0.1, 0.2, 0.5, 0.2). According to the previous definition, it can be determined that: the probability corresponding to the 00 mode result is 0.1; the probability corresponding to the 01 mode result is 0.2; the probability corresponding to the 10 mode result is 0.5; and the probability corresponding to the 11 mode result is 0.2.

Methods for obtaining the first vector calculated by the first fully connected layer and the second vector calculated by the first normalization layer, may be found in the prior art, which will not be described in detail herein.

In the above step S13a, in one embodiment, a possible selected result with the highest probability in the plurality of possible selected results may be determined as a target selected result. In another implementation, the respective probabilities corresponding to the plurality of possible selected results are used as an input of a probability density function of a multivariate normal distribution, and the probability density function is executed to obtain an output result. The target selected result is determined from the plurality of possible selected results according to the output result. In this way, a certain degree of randomness can be introduced in the form of probability, and a better result can be explored.

In the above step S14a, the selected features can be determined according to the target selected result, and the selected features can be used as the attention features corresponding to the first feature combination. For example, following the above example, if the target selected result is the 11 mode result, both the video frame features and the text word features are the attention features corresponding to the first feature combination; if the target selected result is the 10 mode result, the video frame features are the attention features corresponding to the first feature combination; and if the target selected result is the 00 mode result, the first feature combination has no attention feature.

It should be additionally noted that for each feature combination in the plurality of above feature combinations, the above step 1021 may be performed once to obtain attention features corresponding to each feature combination. The process of repeatedly performing the above step 1021 may be performed in an order of a feature combination sequence formed by the plurality of feature combinations. The order of the feature combination sequence formed by the plurality of feature combinations is also a sampling order of the plurality of feature combinations. For example, a feature combination obtained by the first sampling is ranked first, and a feature combination obtained by the second sampling is ranked second. The process of repeatedly performing the above step 1021 is also an entire process of decision on the feature combination sequence. In the above embodiment, the feature combination obtained by each sampling can be regarded as a "state" of a time node, and the target selected result corresponding to the feature combination obtained by decision can be regarded as a decision "action" at the corresponding time node. When the entire feature combination sequence decision process reaches a maximum number of decision steps (equal to the above maximum number of sampling times), a complete decision action sequence will be outputted, and each decision action in the decision action sequence has a corresponding attention feature.

In another example, each feature in the plurality of first features constituting the first feature combination has two possibilities of being selected and not being selected. The above step 1021 may comprise the following steps.

Step S11b. Calculate, by using the first computational model, a selected probability of each feature in the plurality of first features constituting the first feature combination.

Step S12b. Determine, according to the selected probability of each feature in the plurality of first features, the attention features corresponding to the first feature combination.

In the above step S11a, the first fused feature may be determined according to the plurality of first features. The first fused feature is used as an input of a second fully connected layer in the first computational model to obtain a third vector outputted by the second fully connected layer. The third vector is used as an input of a second normalization layer in the first computational model to obtain a fourth vector outputted by the second normalization layer. The selected probability of each feature in the plurality of first features of the first feature combination is determined according to the fourth vector.

The number of channels of the second fully connected layer is consistent with the number of the plurality of first features, and the dimensionalities of the third vector and the fourth vector are consistent with the number of the plurality of first features. The plurality of first features include video frame features and text word features. The fourth vector is (0.6, 0.4). According to the previous definition, it can be determined that the selected probability of the video frame features is 0.6, and the selected probability of the text word features is 0.4.

In the above step S12b, a feature with a selected probability greater than a preset probability value in the plurality of first features may be determined as an attention feature corresponding to the first feature combination. The preset probability value may be set according to actual needs, for example, it may be set to 0.5.

In this way, according to the fourth vector (0.6, 0.4), the video frame features may be used as the attention features corresponding to the first feature combination.

In the above step 1022, when the number of the attention features corresponding to the first feature combination is greater than a first preset threshold, the attention features corresponding to the first feature combination are combined to obtain the semantically relevant feature combination. The magnitude of the first preset threshold may be set according to actual needs, which is not specifically limited in this embodiment. For example, the first preset threshold may be set to 1, or the first preset threshold may be set to m−1, where m is the number of the plurality of first features constituting the first feature combination.

In order to improve the categorization accuracy of the model, during the multimedia file categorization, in addition to referring to the semantically relevant feature combination, attention features corresponding to a feature combination of which the number of attention features is less than or equal to the first preset threshold can also be taken into consideration to improve the categorization accuracy of the model. In one embodiment, the above step 103 may comprise the following steps.

Step 1031. Categorize the multimedia file by using the first computational model with reference to the semantically relevant feature combination and attention features corresponding to a second feature combination.

The number of the attention features corresponding to the second feature combination is less than or equal to the first preset threshold, and the plurality of feature combinations include the second feature combination.

In some embodiments, the above step 1031 may comprise the following steps.

Step S21. Determine a second fused feature according to a plurality of second features constituting the semantically relevant feature combination.

Step S22. Determine a third fused feature according to the attention features corresponding to the second feature combination.

Step S23. Input the second fused feature and the third fused feature in the form of a sequence to a feature sequence aggregation network in the first computational model to obtain an aggregated feature.

Step S24. Input the aggregated feature to a categorizer in the first computational model to obtain a categorization result of the multimedia file.

In some embodiments, the dimensionalities of the second fused feature and the third fused feature are the same.

In the above step S21, the second fused feature may be obtained by splicing or adding, on an element basis, the plurality of second features constituting the semantically relevant feature combination.

In the above step S22, the second fused feature may be obtained by splicing or adding, on an element basis, the attention features corresponding to the second feature combination.

It should be noted that, in the method of obtaining the second fused feature and the third fused feature by splicing, a vector corresponding to the second fused feature includes not only all vector elements in vectors corresponding to the plurality of second features, but also correspondingly include all vector elements in all-zero vectors corresponding to modalities that are not included in the semantically relevant feature combination. A vector corresponding to the third fused feature includes not only all vector elements in vectors corresponding to the attention features corresponding to the second feature combination, but also all vector elements in all-zero vectors corresponding to modalities that are not included in the attention features corresponding to the second feature combination.

In some embodiments, there may be a plurality of semantically relevant feature combinations, and there may also be a plurality of second feature combinations. The second fused feature corresponding to each semantically relevant feature combination in the plurality of semantically relevant feature combinations and the third fused feature corresponding to each feature combination in the plurality of second feature combinations are arranged temporally or randomly to form the above sequence.

The feature sequence aggregation network may be an LSTM (Long Short-Term Memory) or NeXtVLAD network. When the feature sequence aggregation network is the LSTM, the above plurality of feature combinations may be obtained by sampling according to a temporal sequence, and the plurality of fused features in the sequence also need to be arranged according to a temporal sequence.

The above categorizer may be implemented by a third fully connected layer and a third normalization layer. For details, reference can be made to the prior art, which will not be described in detail herein.

Further, the at least two types of modality information may include image modality information, and the above method may further include the following step.

Step 104. Input a plurality of video frames in the image modality information to an image feature extraction model and extract respective image features corresponding to the plurality of video frames. The respective image features corresponding to the plurality of video frames constitute a feature set corresponding to the image modality information. It should be additionally noted that the image features herein are also video frame features.

Further, the at least two types of modality information include text modality information, and the above method may further include the following step.

Step 105. Input a plurality of text words in the text modality information to a text word feature extraction model and extract respective text word features corresponding to the plurality of text words.

The respective text word features corresponding to the plurality of text words constitute a feature set corresponding to the text modality information.

The image feature extraction model may be a convolutional neural network, and the text word feature extraction model may be a fast text categorizer, such as FastText.

Text description information of the multimedia file may be obtained in advance, and the text description information may be segmented to obtain a plurality of text words.

In summary, for a multi-modality video categorizing task, in order to solve the problem of semantic misalignment during feature fusion, this method uses an attention mechanism to model semantically relevant combination learning as a sequence decision process, introduces an end-to-end deep reinforcement learning framework, and makes a decision on a feature combination obtained by each sampling to obtain key features corresponding to the combination, i.e., a semantically relevant combination. The method provided by this embodiment has been verified on a large-scale public data set in the video field, and the video categorization accuracy can be improved by about three (3) percentage points.

Figure 7:
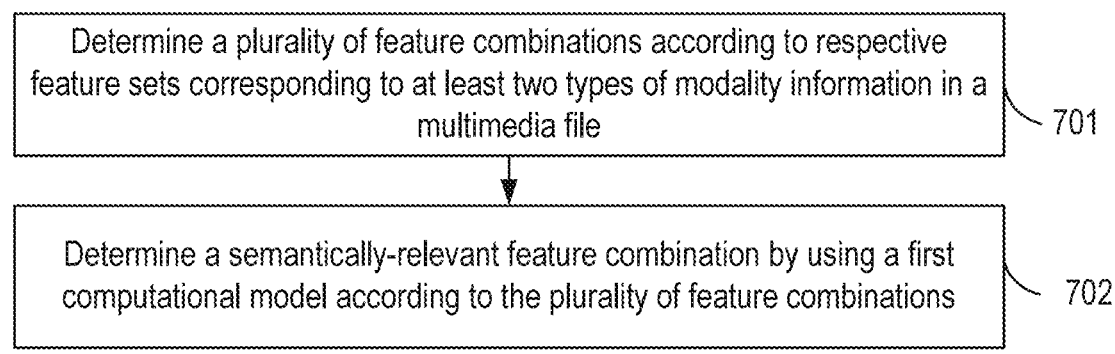
FIG. 7 is a flow diagram of an information processing method according to some embodiments of the disclosure.

FIG. 7 is a flow diagram of an information processing method according to some embodiments of the disclosure. As shown in FIG. 7, the method includes the following steps.

Step 701. Determine a plurality of feature combinations according to respective feature sets corresponding to at least two types of modality information in a multimedia file.

Step 702. Determine a semantically relevant feature combination by using a first computational model according to the plurality of feature combinations.

The multimedia file comprises a plurality of types of modality information, and the plurality of types of modality information include at least two of modalities selected from the group consisting of a text modality, an image modality, and a voice modality.

A plurality of features constituting the feature combinations are selected from feature sets corresponding to different modality information.

In one embodiment of the above steps 701 and 702, reference can be made to the corresponding content in the foregoing embodiments, and details are not repeated herein.

In this embodiment, the plurality of feature combinations are determined according to the respective feature sets corresponding to the at least two types of modality information in the multimedia file, and then the semantically relevant feature combination is determined by using the first computational model according to the plurality of feature combinations. The semantically relevant feature combination has a stronger expression capability and higher value. Categorizing the multimedia file subsequently by using this feature combination can effectively improve the categorization accuracy of the multimedia file.

It should be noted that for content of the method that is not fully detailed in the steps provided in this embodiment, reference can be made to the corresponding content in the above embodiments, and details are not repeated herein. Moreover, in addition to the above steps, the method according to this embodiment may also include other parts or all of the steps in the above embodiments. For specific details, reference can be made to the corresponding content of the above embodiments, and details are not repeated herein.

Figure 2:
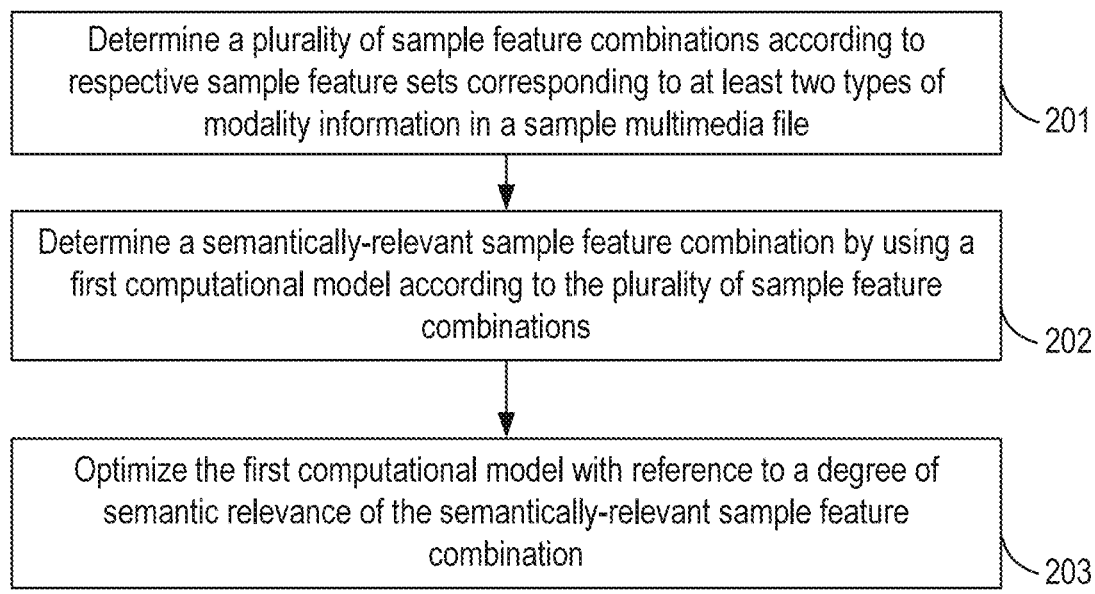
FIG. 2 is a flow diagram of a method for training a model according to some embodiments of the disclosure.

A training method of the first computational model mentioned in the above embodiments will be described below with reference to FIG. 2. As shown in FIG. 2, the method includes the following steps.

Step 201. Determine a plurality of sample feature combinations according to respective sample feature sets corresponding to at least two types of modality information in a sample multimedia file.

Step 202. Determine a semantically relevant sample feature combination by using a first computational model according to the plurality of sample feature combinations.

Step 203. Optimize the first computational model with reference to a degree of semantic relevance of the semantically relevant sample feature combination.

A plurality of sample features constituting the sample feature combinations are from sample feature sets corresponding to different modality information, and the first computational model is configured to identify a multimedia file. The sample multimedia file comprises a plurality of types of modality information, and the plurality of types of modality information include at least two of modalities selected from the group consisting of a text modality, an image modality, and a voice modality.

In addition, a predicted categorization result of the sample multimedia file may also be obtained using the first computational model with reference to the semantically relevant sample feature combination. In one embodiment, reference can be made to the corresponding step 103 of FIG. 1 which will not be repeated herein.

In the above step 201, in one embodiment of determining a plurality of sample feature combinations according to respective sample feature sets corresponding to at least two types of modality information in a sample multimedia file, reference can be made to steps 101 and 701 of FIGS. 1 and 7, respectively, in the above embodiments. The specific implementations of the two are consistent, and details will not be repeated herein.

In the above step 202, in one embodiment of determining a semantically relevant sample feature combination by using a first computational model according to the plurality of sample feature combinations, reference may also be made to steps 102 and 702 of FIGS. 1 and 7, respectively, in the above embodiments. The specific implementations of the two are consistent, and details will not be repeated herein.

In the above step 203, the degree of semantic relevance of the semantically relevant sample feature combination comprises a degree of semantic relevance between a plurality of second sample features constituting the semantically relevant sample feature combination. The optimizing the first computational model with reference to the degree of semantic relevance may specifically be optimizing related parameters in the model by using a stochastic gradient descent algorithm. For the implementation details of the stochastic gradient descent algorithm, reference can be made to the prior art, and details are not repeated herein.

There may be a plurality of semantically relevant sample feature combinations. The degrees of semantic relevance of the plurality of semantically relevant sample feature combinations may be summed to obtain an inter-modality relevance reward signal. The model is optimized according to the inter-modality relevance reward signal.

The optimization the model with reference to the degrees of semantic relevance of the semantically relevant sample feature combinations can effectively ensure that the model can accurately obtain the semantically relevant feature combination by screening in a subsequent application process, so as to improve the categorization accuracy of the model in the application process.

The technical solution provided by this embodiment identifies a semantically relevant feature combination in a process of categorizing a multimedia file by synthesizing features corresponding to a plurality of modalities of the multimedia file. The semantically relevant feature combination has a stronger expression capability and higher value. Categorizing the multimedia file by using this feature combination can effectively improve the categorization accuracy of the multimedia file.

In one embodiment, the above method may further include the following steps.

Step 204. Calculate a similarity between a plurality of second sample features constituting the semantically relevant sample feature combination.

Step 205. Use the similarity as the degree of semantic relevance of the semantically relevant sample feature combination.

In the above step 204, the similarity may be a cosine similarity between the plurality of second sample features or an inner product between the plurality of second sample features. For a calculation method of the cosine similarity, reference can be made to the prior art, and details are not described herein.

The above step 204 may specifically be: calculating an inner product between respective vectors corresponding to the plurality of second sample features to serve as the similarity.

For example, the plurality of second sample features include: a feature Q (q1, q2, q3) and a feature P (p1, p2, p3), and the inner product is q1*p1+q2*p2+q3*p3.

Further, the plurality of sample feature combinations includes a first sample feature combination. In some embodiments, the above step 202 may comprise the following steps.

Step 2021. Determine, by using an attention mechanism of the first computational model, attention sample features corresponding to the first sample feature combination from a plurality of first sample features constituting the first sample feature combination.

Step 2022. When the number of the attention sample features corresponding to the first sample feature combination is greater than a first preset threshold, combine the attention sample features corresponding to the first sample feature combination to obtain the semantically relevant sample feature combination.

In one embodiment of the above steps 2021 and 2022, reference can be made to the specific implementations of the "determining, by using an attention mechanism of the first computational model, attention features corresponding to the first feature combination from a plurality of first features constituting the first feature combination" and "when the number of the attention features corresponding to the first feature combination is greater than a first preset threshold, combining the attention features corresponding to the first feature combination to obtain the semantically relevant feature combination," as described in steps 1021 and 1022, respectively, which will not be repeated herein.

To ensure the description capability of the attention features obtained by the model by screening in the subsequent application process for the feature set before the screening, it is necessary to optimize the model with reference to the reconstruction capability of the attention sample features during the training. Specifically, the above method may further include the following step.

Step 206. Determine a degree of reconstruction of the sample features in the plurality of sample feature combinations by attention sample features corresponding to the plurality of sample feature combinations.

Specifically, respective attention feature sets corresponding to the plurality of pieces of modality information may be determined according to the attention sample features corresponding to the plurality of sample feature combinations. A degree of sub-reconstruction of the feature set corresponding to each piece of modality information by the attention feature corresponding to each piece of modality information is determined respectively, and the degrees of sub-reconstruction corresponding to the various pieces of modality information are synthesized to obtain the above degree of reconstruction.

The at least two types of modality information includes first modality information. For third features in a feature set corresponding to the first modality information, attention features closest to the third features are determined from an attention feature set corresponding to the first modality information, errors between the third features and the attention features closest to the third features are calculated, and finally the errors corresponding to all the features in the feature set corresponding to the first modality information are summed to obtain a degree of sub-reconstruction corresponding to the first modality information. The errors may be, for example, bisection errors.

Correspondingly, the step of optimizing the first computational model with reference to the degree of semantic relevance of the semantically relevant sample feature combination in step 203 may comprise the following step.

Step 2031. Optimize the first computational model with reference to the degree of semantic relevance of the semantically relevant sample feature combination and the degree of reconstruction.

The degree of reconstruction is an intra-modality reconstructive reward signal. The intra-modality reconstructive reward signal functions to ensure the description capability of the attention features for the feature set and retain effective information as much as possible.

Further, the above method may further include the following steps.

Step 207. Obtain, by using the first computational model, a predicted categorization result of the sample multimedia file according to the semantically relevant sample feature combination and attention sample features corresponding to a second sample feature combination.

The number of the attention features corresponding to the second sample feature combination is less than or equal to the first preset threshold, and the plurality of sample feature combinations include the second sample feature combination.

Step 208. Calculate a first loss according to the predicted categorization result and an expected categorization result of the sample multimedia file.

In one embodiment of the above step 207, reference can be made to the specific implementation of the "categorizing the multimedia file by using the first computational model with reference to the semantically relevant feature combination and attention features corresponding to a second feature combination," as described in step 1031, in the above embodiments, which will not be repeated herein.

In the above step 208, the predicted categorization result may include: probabilities that the sample multimedia file belongs to a plurality of categories. The expected categorization result of the sample multimedia file includes an expected category. Specifically, a cross-entropy loss function may be used to calculate the first loss.

In one embodiment, step 203 may include: optimizing the first computational model with reference to the degree of semantic relevance of the semantically relevant sample feature combination and the first loss. The degrees of semantic relevance corresponding to the plurality of semantically relevant sample feature combinations may be summed to obtain an inter-modality relevance reward signal; and a negative number of the first loss is used as a supervisory reward signal. The model is optimized according to the inter-modality relevance reward signal and the supervisory reward signal.

In another embodiment, the above step 2031 comprises: optimizing the first computational model with reference to the degree of semantic relevance of the semantically relevant sample feature combination, the degree of reconstruction, and the first loss. Specifically, the model is optimized according to the inter-modality relevance reward signal, the intra-modality reconstructive reward signal, and the supervisory reward signal mentioned in the above embodiments.

In summary, for practical problems, the three reward signals of inter-modality relevance, intra-modality reconstruction, and cross-entropy categorization loss are designed for optimization of the model. Experiments show that each type of reward signal can bring different levels of performance improvement.

A neural network system will be introduced in the following. The neural network system includes: a determining module, configured to determine a plurality of feature combinations according to respective feature sets corresponding to at least two types of modality information in a multimedia file, where a plurality of features constituting the feature combinations are selected from feature sets corresponding to different modality information; and at least one first network layer, configured to determine a semantically relevant feature combination according to the plurality of feature combinations, where the multimedia file comprises a plurality of types of modality information, and the plurality of types of modality information include at least two of modalities selected from the group consisting of a text modality, an image modality, and a voice modality.

The technical solution provided by this embodiment identifies a semantically relevant feature combination in a process of categorizing a multimedia file by synthesizing features corresponding to a plurality of modalities of the multimedia file. The semantically relevant feature combination has a stronger expression capability and higher value. Categorizing the multimedia file by using this feature combination can effectively improve the categorization accuracy of the multimedia file.

Further, the above system may further include: the at least one second network layer, configured to categorize the multimedia file with reference to the semantically relevant feature combination.

For specific processing processes of the at least one first network layer and at least one second network layer, reference can be made to the corresponding content in the above embodiments, and details are not repeated herein.

Further, the at least two types of modality information include image modality information. The above system further includes: at least one third network layer, configured to input a plurality of video frames in the image modality information to an image feature extraction model, and extract respective image features corresponding to the plurality of video frames; and constitute a feature set corresponding to the image modality information with the respective image features corresponding to the plurality of video frames.

Further, the at least two types of modality information include text modality information. The above system further includes: at least one fourth network layer, configured to input a plurality of text words in the text modality information to a text word feature extraction model, and extract respective text word features corresponding to the plurality of text words; and constitute a feature set corresponding to the text modality information with the respective text word features corresponding to the plurality of text words.

The at least one third network layer and the at least one fourth network layer input their obtained feature sets to the at least one first network layer, so as to allow the at least one first network layer to determine the plurality of feature combinations.

It should be noted herein that, for content of the steps that is not detailed in the network layers provided in the system according to this embodiment, reference can be made to the corresponding content in the above embodiments of FIGS. 1, 2, and 7, and details are not repeated herein. Moreover, in addition to the above steps, the various network layers in the system provided by this embodiment may also implement other parts or all of the steps in the above embodiments. For specific details, reference can be made to the corresponding content of the above embodiments, which are not repeated herein. In one embodiment, the network layer specifically refers to a neural network layer.

Figure 6:
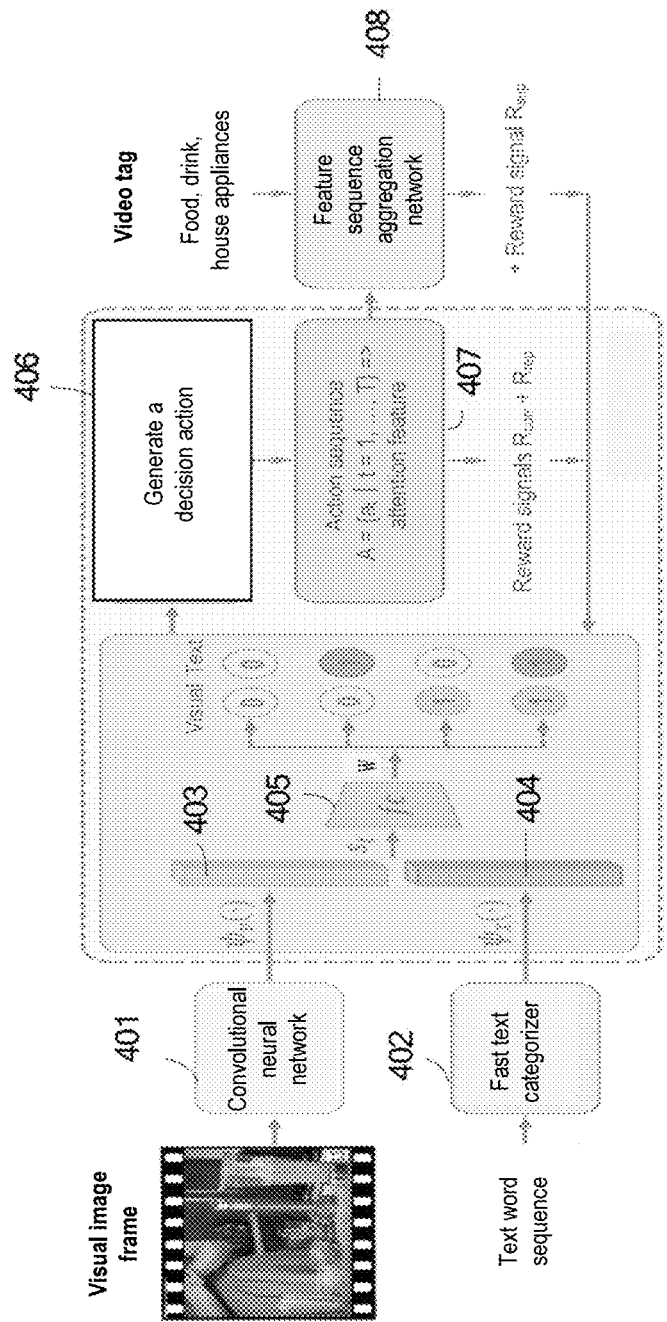
FIG. 6 is a diagram of a processing flow according to some embodiments of the disclosure.

The technical solution provided by this embodiment will be described in detail below with reference to a diagram of a processing flow of the technical solution according to this embodiment shown in FIG. 6. As shown in FIG. 6: a convolutional neural network 401 performs feature extraction on each video frame in a video frame sequence to obtain a video frame feature corresponding to each video frame, so as to constitute a first feature set corresponding to an image modality.

A rapid text categorizer 402 performs feature extraction on each text word in a text word sequence to obtain a text word feature corresponding to each text word, so as to constitute a second feature set corresponding to a text modality.

A video frame feature $\psi_v(\blacksquare)$ (i.e., an image feature) is obtained by sampling the first feature set, and the video frame feature $\psi_v(\blacksquare)$ is linearly mapped by a first fourth fully connected layer 403 corresponding to the image modality in a first computational model to obtain a processed video frame feature.

A video frame feature $\psi_x(\blacksquare)$ is obtained by sampling the second feature set, and the text word feature $\psi_x(\blacksquare)$ is linearly mapped by a second fourth fully connected layer 404 corresponding to the text modality in the first computational model to obtain a processed text word feature.

A feature St obtained by fusing the processed text word feature and processed video frame feature is inputted to a first fully connected layer 405 to obtain a first vector W.

The first vector W is inputted to a first normalization layer to obtain a second vector P, where P includes probabilities $p_t$ corresponding to results of modes 00, 01, 10, and 11. Based on the assumption of polynomial distribution, a target mode result at is determined according to the probabilities $p_t$ corresponding to the results of modes 00, 01, 10, and 11, that is, a decision action 406 is generated.

An "action" sequence A={$a_t$|t=1, . . . , T} is generated, where T is a maximum number of sampling times, and an attention feature 407 may be determined according to the target mode result $a_t$.

An attention feature corresponding to each action in the "action" sequence is inputted to a feature sequence aggregation network 408 to obtain an aggregated feature. A categorization result of the video file may be obtained according to the aggregated feature.

In addition, the model may be optimized with reference to an inter-modality relevance reward signal $R_{corr}$, an intra-modality reconstructive reward $R_{rep}$, and a supervisory reward signal $R_{sup}$.

Figure 9:
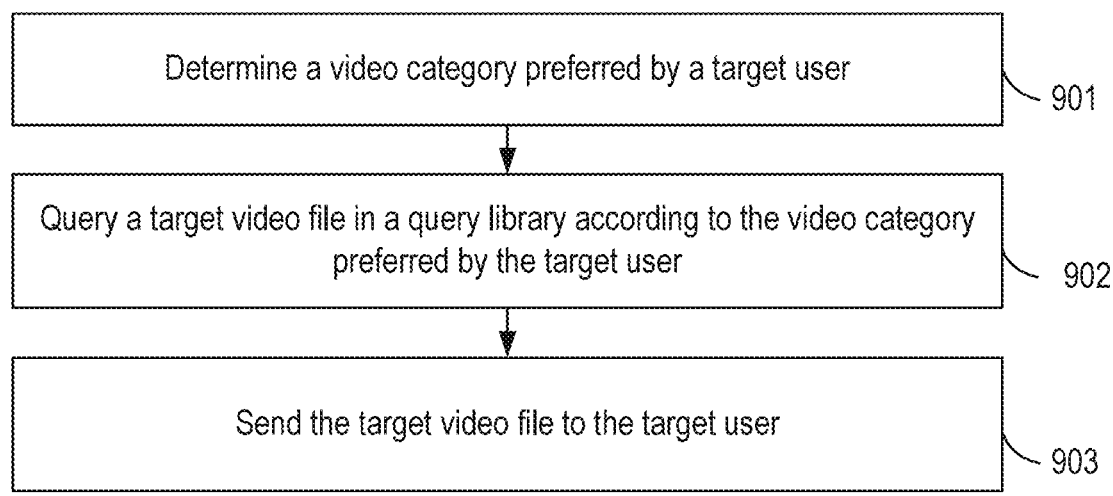
FIG. 9 is a flow diagram of an information processing method according to some embodiments of the disclosure.

FIG. 9 is a flow diagram of an information processing method according to still another embodiment. As shown in FIG. 9, the method includes the following steps.

Step 901. Determine a video category preferred by a target user.

Step 902. Query a target video file in a query library according to the video category preferred by the target user.

Step 903. Send the target video file to the target user.

In the above step 901, the video category preferred by the target user may be analyzed according to user behavior logs of the target user. For example, the video category preferred by the target user may be analyzed according to behavior information such as historical video files watched by the target user, watching duration, and watching frequencies.

In the above step 902, a correspondence between each video file in a plurality of video files and a video category associated with the video file is stored in the query library. The query library may be queried according to the video category preferred by the target user and the correspondence, so as to obtain the target video file.

In the above step 903, the target video file is recommended to the target user. For example, when the target user opens an interface (for example, a recommendation interface), related information of the target video file is displayed on the interface for the target user to select.

In some embodiment, the above method further includes the following steps.

Step 904. Determine a plurality of feature combinations according to respective feature sets corresponding to at least two types of modality information in the video files. A plurality of features constituting the feature combinations are selected from feature sets corresponding to different modality information.

Step 905. Determine a semantically relevant feature combination by using a first computational model according to the plurality of feature combinations.

Step 906. Categorize the video files by using the first computational model with reference to the semantically relevant feature combination so as to obtain video categories to which the video files belong.

The video files are constituted by a plurality of types of modality information, and the plurality of types of modality information include at least one type of modality information in a text modality and a voice modality, and image modality information.

In this embodiment, the multimedia file is specifically a video file. In one embodiment of categorizing video files, reference can be made to the corresponding content in the above embodiments, and details are not repeated herein.

In this embodiment, a plurality of feature combinations are determined according to respective feature sets corresponding to at least two types of modality information in the video files, and then a semantically relevant feature combination is determined using the first computational model according to the plurality of feature combinations. The semantically relevant feature combination has a stronger expression capability and higher value, and categorizing the video files by using this feature combination can effectively improve the categorization accuracy of the video files, thereby effectively improving the precision of video recommendation.

It should be noted herein that for the content of the method that is not fully detailed in the steps provided in this embodiment, reference can be made to the corresponding content in the above embodiments, and details are not repeated herein. Moreover, in addition to the above steps, the method according to this embodiment may also include other parts or all of the steps in the above embodiments. For specific details, reference can be made to the corresponding content of the above embodiments, and details are not repeated herein.

Figure 10:
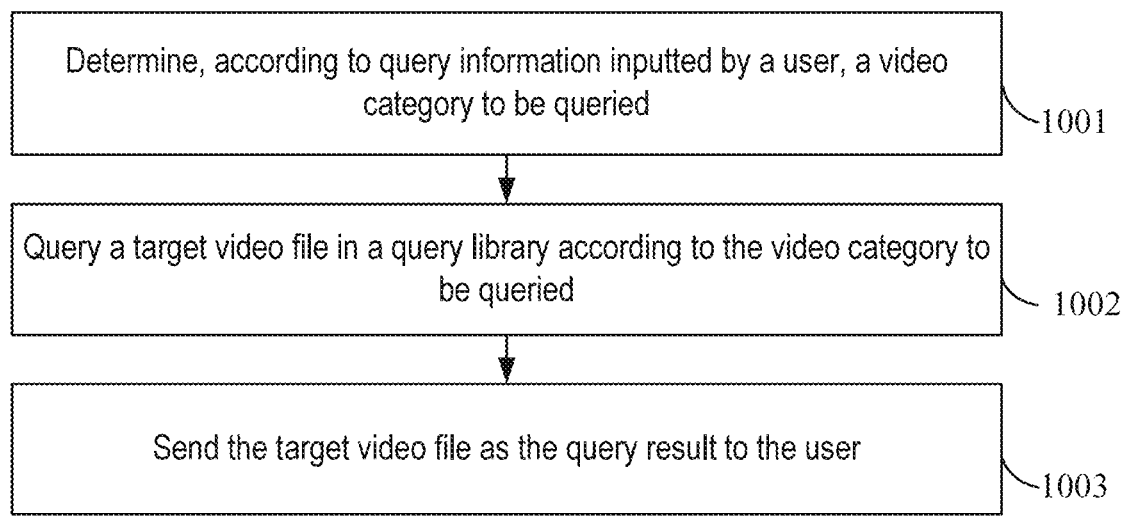
FIG. 10 is a flow diagram of an information processing method according to some embodiments of the disclosure.

FIG. 10 is a flow diagram of an information processing method according to still another embodiment. The method includes the following steps.

Step 1001. Determine, according to query information inputted by a user, a video category to be queried.

Step 1002. Query a target video file in a query library according to the video category to be queried.

Step 1003. Send the target video file as a query result to the user.

In the above step 1001, the query information inputted by the user may be voice information or text information. When the query information is voice information, voice recognition is performed on the voice information to obtain text information; and the video category to be queried is determined according to the text information. For example, the user inputs voice input, "I want to watch a variety show," voice recognition is performed on the voice to obtain text information, and word segmentation processing is performed on the text information to obtain the video category to be queried "variety."

When the query information is text information, the video category to be queried may be directly determined according to the text information.

For the technologies such as voice recognition and word segmentation, reference can be made to the prior art, and details will not be repeated herein.

In the above step 1002, a correspondence between each video file in a plurality of video files and a video category associated with the video file is stored in the query library. The target video file may be obtained by querying according to the video category to be queried and the correspondences.

In the above step 1003, the target video file is sent as the query result to a user terminal of the user and displayed on a search result interface of the user terminal.

The above method further includes determining a plurality of feature combinations according to respective feature sets corresponding to at least two types of modality information in the video files, where a plurality of features constituting the feature combinations are selected from feature sets corresponding to different modality information; determining a semantically relevant feature combination by using a first computational model according to the plurality of feature combinations; and categorizing the video files by using the first computational model with reference to the semantically relevant feature combination so as to obtain video categories to which the video files belong, where the video files are constituted by a plurality of types of modality information, and the plurality of types of modality information include at least one type of modality information in a text modality and a voice modality, and image modality information.

In this embodiment, the multimedia file is specifically a video file. In one embodiment of categorizing video files, reference can be made to the corresponding content in the above embodiments, and details are not repeated herein.

In this embodiment, a plurality of feature combinations are determined according to respective feature sets corresponding to at least two types of modality information in the video files, and then a semantically relevant feature combination is determined using the first computational model according to the plurality of feature combinations. The semantically relevant feature combination has a stronger expression capability and higher value, and categorizing the video files by using this feature combination can effectively improve the categorization accuracy of the video files, thereby effectively improving the precision of video recommendation.

Currently, all vehicles are equipped with driving recorders. The driving recorder is a machine that can record related images and sounds during driving or parking of a vehicle. Since the driving recorder continuously records relevant images and sounds, the volume of recorded video data is very huge. It is difficult to query a small clip of video required in this huge volume of video data. In order to facilitate user querying, the video recorded by the driving recorder may be divided into a plurality of video files according to equal time periods or unequal time periods, that is, the video files are video clips recorded by the driving recorder. Each video file is categorized according to the above video file categorizing method to obtain a video category to which each video file belongs. The categorization herein may specifically refer to the categorization of accident events recorded in the video files. For example, the video files may be categorized into categories such as robber, scratch, rear-end collision, natural disaster, silence (i.e., no accident occurs), and so on. Then, a correspondence between each video file and a video category to which it belongs is established in a query library. In this way, when the user needs to make a query subsequently, he/she only needs to input corresponding query information to find a desired video clip in the huge volume of video data.

In addition, with the continuous development of Internet technologies, video conferencing has become a communication method chosen by many enterprises. During a video conference, video recording will be performed to obtain a video conference recording video. Generally, the video conference recording video has a relatively long time length, and it is also time-consuming if a user intends to find a desired video clip from the video conference recording video. In order to facilitate user querying, the video conference recording video may be divided into a plurality of video files according to equal time periods or unequal time periods, that is, the video files are video conference recording video clips. Each video file is categorized according to the above video file categorizing method to obtain a video category to which each video file belongs. The categorization herein may specifically refer to categorization discussion topics recorded in the video files, and specific categories may be set according to service needs specifically. Then, a correspondence between each video file and a video category to which it belongs is established in a query library. In this way, when the user needs to make a query subsequently, he/she only needs to input corresponding query information to find a desired video clip in the huge volume of video data.

It should be noted herein that for content of the method that is not fully detailed in the steps provided in this embodiment, reference can be made to the corresponding content in the above embodiments, and details are not repeated herein. Moreover, in addition to the above steps, the method according to this embodiment may also include other parts or all of the steps in the above embodiments. For specific details, reference can be made to the corresponding content of the above embodiments, and details are not repeated herein.

Figure 3:
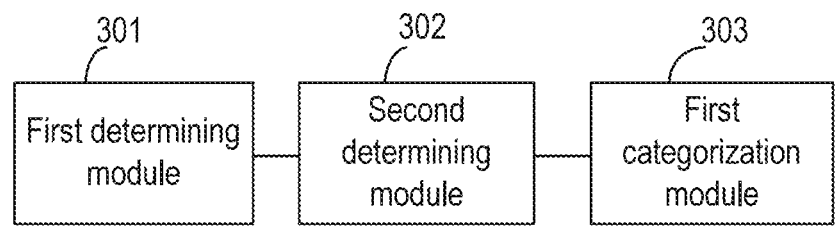
FIG. 3 is a block diagram of a multimedia file categorizing apparatus according to some embodiments of the disclosure.

FIG. 3 is a block diagram of an multimedia file categorizing apparatus according to some embodiments of the disclosure. As shown in FIG. 3, the apparatus includes a first determining module 301, a second determining module 302, and a third categorization module 303.

The first determining module 301 is configured to determine a plurality of feature combinations according to respective feature sets corresponding to at least two types of modality information in a multimedia file.

The second determining module 302 is configured to determine a semantically relevant feature combination by using a first computational model according to the plurality of feature combinations.

The first categorization module 303 is configured to categorize the multimedia file by using the first computational model with reference to the semantically relevant feature combination.

A plurality of features constituting the feature combinations are selected from feature sets corresponding to different modality information; the multimedia file comprises a plurality of types of modality information, and the plurality of types of modality information include at least two of modalities selected from the group consisting of a text modality, an image modality, and a voice modality.

The technical solution provided by this embodiment identifies a semantically relevant feature combination in a process of categorizing a multimedia file by synthesizing features corresponding to a plurality of modalities of the multimedia file. The semantically relevant feature combination has a stronger expression capability and higher value. Categorizing the multimedia file by using this feature combination can effectively improve the categorization accuracy of the multimedia file.

Further, the plurality of feature combinations include a first feature combination.

In some embodiments, the second determining module 302 is configured to determine, by using an attention mechanism of the first computational model, attention features corresponding to the first feature combination from a plurality of first features constituting the first feature combination; and when the number of the attention features corresponding to the first feature combination is greater than a first preset threshold, combine the attention features corresponding to the first feature combination to obtain the semantically relevant feature combination.

In some embodiments, the second determining module 302 is configured to fuse the plurality of first features to obtain a first fused feature; calculate, by using the first computational model according to the first fused feature, respective probabilities corresponding to a plurality of possible selected results corresponding to the plurality of first features; determine a target selected result according to the respective probabilities corresponding to the plurality of possible selected results; and determine, according to the target selected result, the attention features corresponding to the first feature combination.

In some embodiments, the second determining module 302 is configured to use the respective probabilities corresponding to the plurality of possible selected results as an input of a probability density function of a multivariate normal distribution, and execute the probability density function to obtain an output result; and determine the target selected result from the plurality of possible selected results according to the output result.

In some embodiments, the second determining module 302 is configured to splice the plurality of first features to obtain a first fused feature.

In some embodiments, the second determining module 302 is configured to use the first fused feature as an input of a first fully connected layer in the first computational model to obtain a first vector outputted by the first fully connected layer; use the first vector as an input of a first normalization layer in the first computational model to obtain a second vector outputted by the first normalization layer; and determine, according to the second vector, respective probabilities corresponding to the plurality of possible selected results.

Further, each feature in the plurality of first features has two possibilities of being selected and not being selected; and the apparatus may further include a third determining module, configured to determine, according to the two possibilities of being selected and not being selected possessed by each feature in the plurality of first features, the plurality of possible selected results corresponding to the plurality of first features.

In some embodiments, the first categorization module 303 is configured to categorize the multimedia file by using the first computational model with reference to the semantically relevant feature combination and attention features corresponding to a second feature combination, where the number of the attention features corresponding to the second feature combination is less than or equal to the first preset threshold, and the plurality of feature combinations include the second feature combination.

In some embodiments, the first categorization module 303 is configured to determine a second fused feature according to a plurality of second features constituting the semantically relevant feature combination; determine a third fused feature according to the attention features corresponding to the second feature combination; input the second fused feature and the third fused feature in the form of a sequence to a feature sequence aggregation network in the first computational model to obtain an aggregated feature; and input the aggregated feature to a categorizer in the first computational model to obtain a categorization result of the multimedia file.

In some embodiments, the plurality of feature combinations include a first feature combination; and the first determining module is configured to respectively select a feature from each feature set in the respective feature sets corresponding to the at least two types of modality information; linearly map the feature selected from each feature set to obtain a plurality of features of the same dimensionality; and combine the plurality of features of the same dimensionality into the third feature combination.

In some embodiments, the at least two types of modality information include image modality information, and the apparatus further includes a first feature extracting module, configured to input a plurality of video frames in the image modality information to an image feature extraction model, and extract respective image features corresponding to the plurality of video frames; and constitute a feature set corresponding to the image modality information with the respective image features corresponding to the plurality of video frames.

In some embodiments, the at least two types of modality information include text modality information, and the apparatus further includes a second feature extracting module, configured to input a plurality of text words in the text modality information to a text word feature extraction model, and extract respective text word features corresponding to the plurality of text words; and constitute a feature set corresponding to the text modality information with the respective text word features corresponding to the plurality of text words.

It should be noted herein that the multimedia file categorizing apparatus provided in the above embodiment can implement the technical solutions described in the above method embodiments. In one embodiment principles of the above modules or units, reference can be made to the corresponding content in the above method embodiments, which will not be repeated herein.

Figure 8:
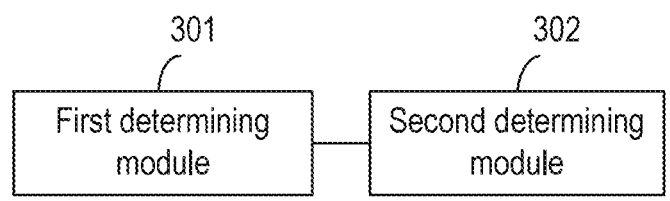
FIG. 8 is a block diagram of an information processing apparatus according to some embodiments of the disclosure.

FIG. 8 is a block diagram of an information processing apparatus according to still another embodiment. As shown in FIG. 8, the apparatus includes a first determining module 301 and a second determining module 302.

The first determining module 301 is configured to determine a plurality of feature combinations according to respective feature sets corresponding to at least two types of modality information in a multimedia file.

The second determining module 302 is configured to determine a semantically relevant feature combination by using a first computational model according to the plurality of feature combinations.

A plurality of features constituting the feature combinations are selected from feature sets corresponding to different modality information; the multimedia file comprises a plurality of types of modality information, and the plurality of types of modality information include at least two of modalities selected from the group consisting of a text modality, an image modality, and a voice modality.

The technical solution provided by this embodiment identifies a semantically relevant feature combination in a process of categorizing a multimedia file by synthesizing features corresponding to a plurality of modalities of the multimedia file. The semantically relevant feature combination has a stronger expression capability and higher value. Categorizing the multimedia file by using this feature combination can effectively improve the categorization accuracy of the multimedia file.

It should be noted herein that the multimedia file categorizing apparatus provided in the above embodiment can implement the technical solutions described in the above method embodiments. In one embodiment principles of the above modules or units, reference can be made to the corresponding content in the above method embodiments, which will not be repeated herein.

Figure 4:
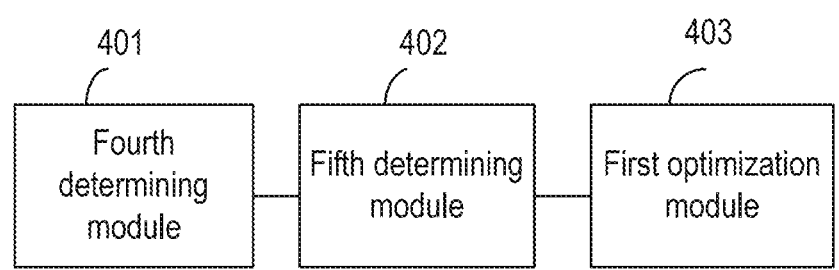
FIG. 4 is a block diagram of a model training apparatus according to some embodiments of the disclosure.

FIG. 4 is a block diagram of a model training apparatus according to some embodiments of the disclosure. As shown in FIG. 4, the apparatus includes: a fourth determining module 401, a fifth determining module 402, and a first optimization module 403.

The fourth determining module 401 is configured to determine a plurality of sample feature combinations according to respective sample feature sets corresponding to at least two types of modality information in a sample multimedia file, where a plurality of sample features constituting the sample feature combinations are from sample feature sets corresponding to different modality information.

The fifth determining module 402 is configured to determine a semantically relevant sample feature combination by using a first computational model according to the plurality of sample feature combinations.

The first optimization module 403 is configured to optimize the first computational model with reference to a degree of semantic relevance of the semantically relevant sample feature combination.

The sample multimedia file comprises a plurality of types of modality information, and the plurality of types of modality information include at least two of modalities selected from the group consisting of a text modality, an image modality, and a voice modality; and the first computational model is configured to identify a multimedia file.

The technical solution provided by this embodiment identifies a semantically relevant feature combination in a process of categorizing a multimedia file by synthesizing features corresponding to a plurality of modalities of the multimedia file. The semantically relevant feature combination has a stronger expression capability and higher value. Categorizing the multimedia file by using this feature combination can effectively improve the categorization accuracy of the multimedia file.

In some embodiments, the apparatus may further include a first calculation module, configured to calculate a similarity between a plurality of second sample features constituting the semantically relevant sample feature combination and use the similarity as the degree of semantic relevance of the semantically relevant sample feature combination.

In some embodiments, the first calculation module is configured to: calculate an inner product between respective vectors corresponding to the plurality of second sample features to serve as the similarity.

In some embodiments, the plurality of sample feature combinations include a first sample feature combination, and the fifth determining module 402 is configured to determine, by using an attention mechanism of the first computational model, attention sample features corresponding to the first sample feature combination from a plurality of first sample features constituting the first sample feature combination; and when the number of the attention sample features corresponding to the first sample feature combination is greater than a first preset threshold, combine the attention sample features corresponding to the first sample feature combination to obtain the semantically relevant sample feature combination.

The apparatus may further include a sixth determining module, configured to determine a degree of reconstruction of the sample features in the plurality of sample feature combinations by attention sample features corresponding to the plurality of sample feature combinations.

In some embodiments, the first optimization module 403 is configured to: optimize the first computational model with reference to the degree of semantic relevance of the semantically relevant sample feature combination and the degree of reconstruction.

In some embodiments, the apparatus may further include: a second categorization module, configured to obtain a predicted categorization result of the sample multimedia file by using the first computational model according to the semantically relevant sample feature combination and attention sample features corresponding to a second sample feature combination, where the number of the attention features corresponding to the second sample feature combination is less than or equal to the first preset threshold, and the plurality of sample feature combinations include the second sample feature combination; and a second calculation module, configured to calculate a first loss according to the predicted categorization result and an expected categorization result of the sample multimedia file.

Correspondingly, the first optimization module 403 is configured to: optimize the first computational model with reference to the degree of semantic relevance of the semantically relevant sample feature combination, the degree of reconstruction, and the first loss.

It should be noted herein that the model training apparatus provided in the above embodiment can implement the technical solutions described in the above method embodiments. In one embodiment principles of the above modules or units, reference can be made to the corresponding content in the above method embodiments, which will not be repeated herein.

Figure 11:
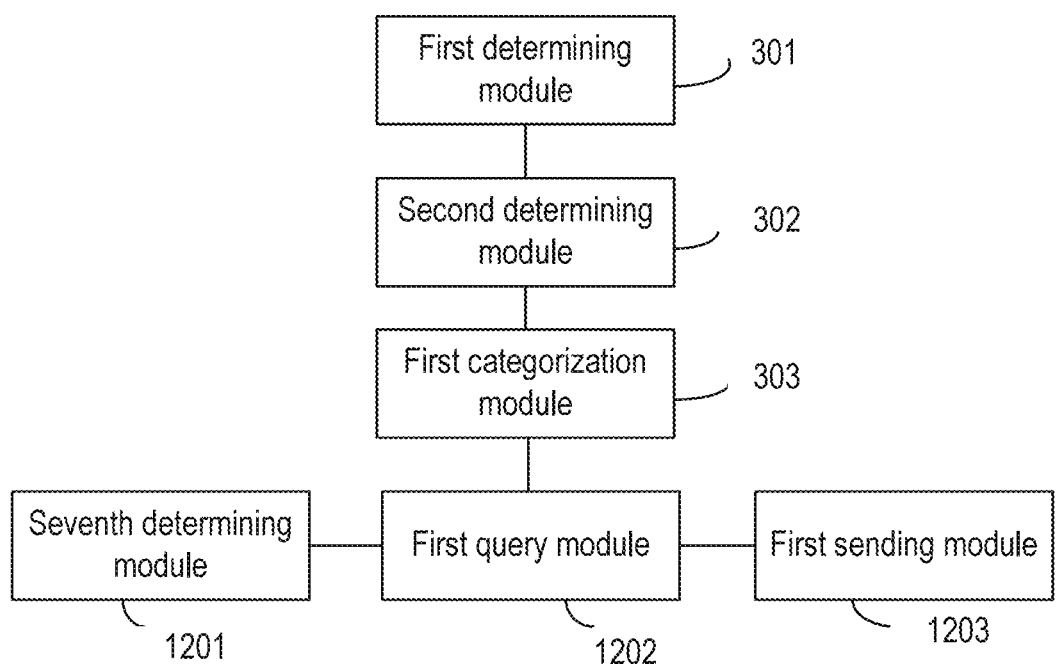
FIG. 11 is a block diagram of a video query or recommendation apparatus according to some embodiments of the disclosure.

FIG. 11 is a block diagram of a video recommendation apparatus according to some embodiments of the disclosure.

As shown in FIG. 11, the apparatus includes: a seventh determining module 1201, a first query module 1202, and a first sending module 1203.

The seventh determining module 1201 is configured to determine a video category preferred by a target user.

The first query module 1202 is configured to query a target video file in a query library according to the video category preferred by the target user, where a correspondence between each video file in a plurality of video files and a video category associated with the video file is stored in the query library.

The first sending module 1203 is configured to send the target video file to the target user.

In some embodiments, the apparatus further includes a first determining module 301, configured to determine a plurality of feature combinations according to respective feature sets corresponding to at least two types of modality information in the video files, where a plurality of features constituting the feature combinations are selected from feature sets corresponding to different modality information; a second determining module 302, configured to determine a semantically relevant feature combination by using a first computational model according to the plurality of feature combinations; and a first categorization module 303, configured to categorize the video files by using the first computational model with reference to the semantically relevant feature combination so as to obtain video categories to which the video files belong, where the video files are constituted by a plurality of types of modality information, and the plurality of types of modality information include at least one type of modality information in a text modality and a voice modality, and image modality information.

It should be noted herein that the video recommendation apparatus provided in the above embodiment can implement the technical solutions described in the above method embodiments. In one embodiment principles of the above modules or units, reference can be made to the corresponding content in the above method embodiments, which will not be repeated herein.

FIG. 11 is a block diagram of a video query apparatus according to some embodiments of the disclosure. As shown in FIG. 11, the apparatus includes: a seventh determining module 1201, a first query module 1202, and a first sending module 1203.

The seventh determining module 1201 is configured to determine, according to query information inputted by a user, a video category to be queried.

The first query module 1202 is configured to query a target video file in a query library according to the video category to be queried, where a correspondence between each video file in a plurality of video files and a video category associated with the video file is stored in the query library.

The first sending module 1203 is configured to send the target video file as a query result to the user.

In some embodiments, the apparatus further includes a first determining module 301, configured to determine a plurality of feature combinations according to respective feature sets corresponding to at least two types of modality information in the video files, where a plurality of features constituting the feature combinations are selected from feature sets corresponding to different modality information; a second determining module 302, configured to determine a semantically relevant feature combination by using a first computational model according to the plurality of feature combinations; and a first categorization module 303, configured to categorize the video files by using the first computational model with reference to the semantically relevant feature combination so as to obtain video categories to which the video files belong, where the video files are constituted by a plurality of types of modality information, and the plurality of types of modality information include at least one type of modality information in a text modality and a voice modality, and image modality information.

Further, the video files are video clips recorded by a driving recorder.

Further, the video files are video clips recorded in a video conference.

It should be noted herein that the video query apparatus provided in the above embodiment can implement the technical solutions described in the above method embodiments. In one embodiment principles of the above modules or units, reference can be made to the corresponding content in the above method embodiments, which will not be repeated herein.

Figure 5:
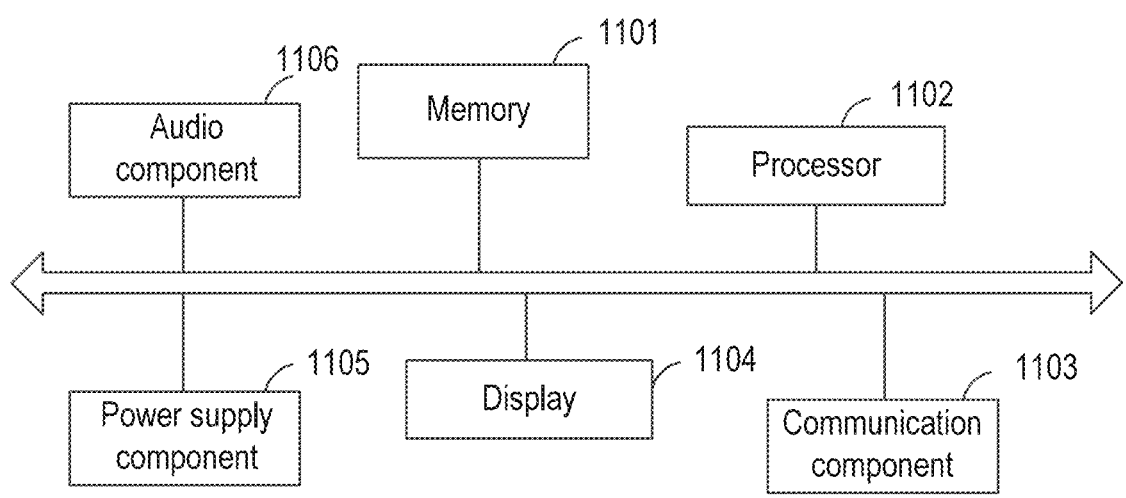
FIG. 5 is a block diagram of an electronic device according to some embodiments of the disclosure.

FIG. 5 is a schematic structural diagram of an electronic device according to some embodiments of the disclosure. As shown in FIG. 5, the electronic device includes a memory 1101 and a processor 1102. The memory 1101 may be configured to store various other data to support operations on the electronic device. Examples of the data include instructions for any applications or methods operating on the electronic device. The memory 1101 may be implemented by any type of volatile or non-volatile storage device or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disc.

The processor 1102 is coupled to the memory 1101, and is configured to execute the program stored in the memory 1101, so as to: determine a plurality of feature combinations according to respective feature sets corresponding to at least two types of modality information in a multimedia file, where a plurality of features constituting the feature combinations are selected from feature sets corresponding to different modality information; determine a semantically relevant feature combination by using a first computational model according to the plurality of feature combinations; and categorize the multimedia file by using the first computational model with reference to the semantically relevant feature combination, where the multimedia file comprises a plurality of types of modality information, and the plurality of types of modality information include at least two of modalities selected from the group consisting of a text modality, an image modality, and a voice modality.

In addition to the above functions, other functions may be implemented when the processor 1102 executes the program in the memory 1101. For details, reference can be made to the description in the foregoing embodiments.

Further, as shown in FIG. 5, the electronic device further includes: a communication component 1103, a display 1104, a power supply component 1105, an audio component 1106, and other components. FIG. 5 only schematically shows some components, and it does not mean that the electronic device includes only the components shown in FIG. 5.

Correspondingly, a computer-readable storage medium storing a computer program is further provided in an embodiment. When executed by a computer, the computer program can implement the steps or functions of the multimedia file categorizing method provided in the foregoing embodiments.

FIG. 5 is a schematic structural diagram of an electronic device according to some embodiments of the disclosure. As shown in FIG. 5, the electronic device includes a memory 1101 and a processor 1102. The memory 1101 may be configured to store various other data to support operations on the electronic device. Examples of the data include instructions for any applications or methods operating on the electronic device. The memory 1101 may be implemented by any type of volatile or non-volatile storage device or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disc.

The processor 1102 is coupled to the memory 1101, and is configured to execute the program stored in the memory 1101, so as to: determine a plurality of feature combinations according to respective feature sets corresponding to at least two types of modality information in a multimedia file, where a plurality of features constituting the feature combinations are selected from feature sets corresponding to different modality information; and determine a semantically relevant feature combination by using a first computational model according to the plurality of feature combinations, where the multimedia file comprises a plurality of types of modality information, and the plurality of types of modality information include at least two of modalities selected from the group consisting of a text modality, an image modality, and a voice modality.

In addition to the above functions, other functions may be implemented when the processor 1102 executes the program in the memory 1101. For details, reference can be made to the description in the foregoing embodiments.

Further, as shown in FIG. 5, the electronic device further includes: a communication component 1103, a display 1104, a power supply component 1105, an audio component 1106, and other components. FIG. 5 only schematically shows some components, and it does not mean that the electronic device includes only the components shown in FIG. 5.

Correspondingly, a computer-readable storage medium storing a computer program is further provided in an embodiment. When executed by a computer, the computer program can implement the steps or functions of the multimedia file categorizing method provided in the foregoing embodiments.

FIG. 5 is a schematic structural diagram of an electronic device according to some embodiments of the disclosure. As shown in FIG. 5, the electronic device includes a memory 1101 and a processor 1102. The memory 1101 may be configured to store various other data to support operations on the electronic device. Examples of the data include instructions for any applications or methods operating on the electronic device. The memory 1101 may be implemented by any type of volatile or non-volatile storage device or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disc.

The processor 1102 is coupled to the memory 1101, and is configured to execute the program stored in the memory 1101, so as to: determine a plurality of sample feature combinations according to respective sample feature sets corresponding to at least two types of modality information in a sample multimedia file, where a plurality of sample features constituting the sample feature combinations are from sample feature sets corresponding to different modality information; determine a semantically relevant sample feature combination by using a first computational model according to the plurality of sample feature combinations; and optimize the first computational model with reference to a degree of semantic relevance of the semantically relevant sample feature combination, where the sample multimedia file comprises a plurality of types of modality information, and the plurality of types of modality information include at least two of modalities selected from the group consisting of a text modality, an image modality, and a voice modality; and the first computational model is configured to categorize the multimedia file.

In addition to the above functions, other functions may be implemented when the processor 1102 executes the program in the memory 1101. For details, reference can be made to the description in the foregoing embodiments.

Further, as shown in FIG. 5, the electronic device further includes: a communication component 1103, a display 1104, a power supply component 1105, an audio component 1106, and other components. FIG. 5 only schematically shows some components, and it does not mean that the electronic device includes only the components shown in FIG. 5.

Correspondingly, a computer-readable storage medium storing a computer program is further provided in an embodiment. When executed by a computer, the computer program can implement the steps or functions of the model training method provided in the foregoing embodiments.

FIG. 5 is a schematic structural diagram of an electronic device according to some embodiments of the disclosure. As shown in FIG. 5, the electronic device includes a memory 1101 and a processor 1102. The memory 1101 may be configured to store various other data to support operations on the electronic device. Examples of the data include instructions for any applications or methods operating on the electronic device. The memory 1101 may be implemented by any type of volatile or non-volatile storage device or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disc.

The processor 1102 is coupled to the memory 1101, and is configured to execute the program stored in the memory 1101, so as to: determine a video category preferred by a target user; query a target video file in a query library according to the video category preferred by the target user, where a correspondence between each video file in a plurality of video files and a video category associated with the video file is stored in the query library; and send the target video file to the target user.

The processor 1102 is further configured to: determine a plurality of feature combinations according to respective feature sets corresponding to at least two types of modality information in the video files, where a plurality of features constituting the feature combinations are selected from feature sets corresponding to different modality information; determine a semantically relevant feature combination by using a first computational model according to the plurality of feature combinations; and categorize the video files by using the first computational model with reference to the semantically relevant feature combination so as to obtain video categories to which the video files belong, where the video files are constituted by a plurality of types of modality information, and the plurality of types of modality information include at least one type of modality information in a text modality and a voice modality, and image modality information.

In addition to the above functions, other functions may be implemented when the processor 1102 executes the program in the memory 1101. For details, reference can be made to the description in the foregoing embodiments.

Further, as shown in FIG. 5, the electronic device further includes: a communication component 1103, a display 1104, a power supply component 1105, an audio component 1106, and other components. FIG. 5 only schematically shows some components, and it does not mean that the electronic device includes only the components shown in FIG. 5.

Correspondingly, a computer-readable storage medium storing a computer program is further provided in an embodiment. When executed by a computer, the computer program can implement the steps or functions of the model training method provided in the foregoing embodiments.

FIG. 5 is a schematic structural diagram of an electronic device according to some embodiments of the disclosure. As shown in FIG. 5, the electronic device includes a memory 1101 and a processor 1102. The memory 1101 may be configured to store various other data to support operations on the electronic device. Examples of the data include instructions for any applications or methods operating on the electronic device. The memory 1101 may be implemented by any type of volatile or non-volatile storage device or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disc.

The processor 1102 is coupled to the memory 1101, and is configured to execute the program stored in the memory 1101, so as to: determine, according to query information inputted by a user, a video category to be queried; query a target video file in a query library according to the video category to be queried, where a correspondence between each video file in a plurality of video files and a video category associated with the video file is stored in the query library; and send the target video file as a query result to the user.

The processor 1102 is further configured to: determine a plurality of feature combinations according to respective feature sets corresponding to at least two types of modality information in the video files, where a plurality of features constituting the feature combinations are selected from feature sets corresponding to different modality information; determine a semantically relevant feature combination by using a first computational model according to the plurality of feature combinations; and categorize the video files by using the first computational model with reference to the semantically relevant feature combination so as to obtain video categories to which the video files belong, where the video files are constituted by a plurality of types of modality information, and the plurality of types of modality information include at least one type of modality information in a text modality and a voice modality, and image modality information.

In addition to the above functions, other functions may be implemented when the processor 1102 executes the program in the memory 1101. For details, reference can be made to the description in the foregoing embodiments.

Further, as shown in FIG. 5, the electronic device further includes: a communication component 1103, a display 1104, a power supply component 1105, an audio component 1106, and other components. FIG. 5 only schematically shows some components, and it does not mean that the electronic device includes only the components shown in FIG. 5.

Correspondingly, a computer-readable storage medium storing a computer program is further provided in an embodiment. When executed by a computer, the computer program can implement the steps or functions of the model training method provided in the foregoing embodiments.

The apparatus embodiments described above are only schematic. The units described as separate components may or may not be physically separated, and the components displayed as units may or may not be physical units, that is, may be located at the same place, or may be distributed in a plurality of network units. The objective of the solution of this embodiment may be implemented by selecting a part of or all the modules according to actual requirements. Those of ordinary skill in the art could understand and implement the present invention without creative efforts.

Through the description of the above implementations, those skilled in the art can clearly understand that the various implementations can be implemented by means of software plus a necessary general hardware platform, and definitely can be implemented by hardware. Based on such understanding, the above technical solution essentially or the portion contributing to the prior art may be embodied in the form of a software product. The computer software product may be stored in a computer readable storage medium, such as a ROM/RAM, a magnetic disk, or an optical disc, and include several instructions that enable a computer device (which may be a personal computer, a server, or a network device) to implement the method in the various embodiments or certain portions of the embodiments.

It should be finally noted that the above embodiments are merely used for illustrating rather than limiting the technical solutions of the present application. Although the present application is described in detail with reference to the foregoing embodiments, those of ordinary skill in the art should understand that the technical solutions recorded in the foregoing embodiments may still be modified or equivalent replacement may be made on partial technical features therein. These modifications or replacements will not make the essence of the corresponding technical solutions be departed from the spirit and scope of the technical solutions in the disclosed embodiments.

What is claimed is:

1. A method comprising:
   determining a plurality of feature combinations based on respective feature sets corresponding to at least two types of modality information in a multimedia file, the multimedia file including a plurality of types of modality information, the types of modality information selected from the group consisting of a text modality, an image modality, and a voice modality;
   fusing a plurality of first features to obtain a first fused feature;
   calculating, using an attention mechanism of a first computational model, probabilities corresponding to a plurality of possible selected results corresponding to the plurality of first features based on the first fused feature;
   determining a target selected result based on the respective probabilities corresponding to the plurality of possible selected results;
   determining attention features corresponding to the first feature combination based on the target selected result;
   combining the attention features corresponding to the first feature combination to obtain a semantically relevant feature combination when a number of the attention features corresponding to the first feature combination is greater than a first preset threshold; and categorizing the multimedia file using the first computational model.

2. The method of claim 1, the determining a target selected result comprising:

using the respective probabilities corresponding to the plurality of possible selected results as an input of a probability density function of a multivariate normal distribution, and executing the probability density function to obtain an output result; and determining the target selected result from the plurality of possible selected results based on the output result.

3. The method of claim 1, the fusing the plurality of first features comprising splicing the plurality of first features to obtain the first fused feature.

4. The method of claim 1, the calculating respective probabilities corresponding to a plurality of possible selected results corresponding to the plurality of first features comprising:

using the first fused feature as an input of a first fully connected layer in the first computational model to obtain a first vector outputted by the first fully connected layer;

using the first vector as an input of a first normalization layer in the first computational model to obtain a second vector outputted by the first normalization layer; and determining, based on the second vector, the respective probabilities corresponding to the plurality of possible selected results.

5. The method of claim 1, further comprising:

determining the plurality of possible selected results corresponding to the plurality of first features based on two possibilities of being selected and not being selected associated with each feature in the plurality of first features.

6. The method of claim 1, the categorizing the multimedia file using the first computational model comprising categorizing the multimedia file using the first computational model with reference to the semantically relevant feature combination and attention features corresponding to a second feature combination, wherein a number of the attention features corresponding to the second feature combination is less than or equal to the first preset threshold, and the plurality of feature combinations comprise the second feature combination.

7. The method of claim 6, the categorizing the multimedia file using the first computational model comprising:

determining a second fused feature based on a plurality of second features constituting the semantically relevant feature combination;

determining a third fused feature based on the attention features corresponding to the second feature combination;

inputting the second fused feature and the third fused feature as a sequence to a feature sequence aggregation network in the first computational model to obtain an aggregated feature; and inputting the aggregated feature to a categorizer in the first computational model to obtain a categorization result of the multimedia file.

8. The method of claim 1, the plurality of feature combinations comprising a third feature combination and determining the third feature combination comprising:

sampling a feature from each feature set in the respective feature sets corresponding to the at least two types of modality information;

linearly mapping the feature selected from each feature set to obtain a plurality of features of a same dimensionality; and combining the plurality of features of a same dimensionality into the third feature combination.

9. The method of claim 1, the at least two types of modality information comprising image modality information, the method further comprising:

inputting a plurality of video frames in the image modality information to an image feature extraction model, and extracting respective image features corresponding to the plurality of video frames; and generating a feature set corresponding to the image modality information with the respective image features corresponding to the plurality of video frames.

10. The method of claim 1, the at least two types of modality information comprising text modality information, the method further comprising:

inputting a plurality of text words in the text modality information to a text word feature extraction model, and extracting respective text word features corresponding to the plurality of text words; and generating a feature set corresponding to the text modality information with the respective text word features corresponding to the plurality of text words.

11. A non-transitory computer-readable storage medium for tangibly storing computer program instructions capable of being executed by a computer processor, the computer program instructions defining steps of:

determining a plurality of feature combinations based on respective feature sets corresponding to at least two types of modality information in a multimedia file, the multimedia file including a plurality of types of modality information, the types of modality information selected from the group consisting of a text modality, an image modality, and a voice modality;

fusing a plurality of first features to obtain a first fused feature;

calculating, using an attention mechanism of a first computational model, probabilities corresponding to a plurality of possible selected results corresponding to the plurality of first features based on the first fused feature;

determining a target selected result based on the respective probabilities corresponding to the plurality of possible selected results;

determining attention features corresponding to the first feature combination based on the target selected result;

combining the attention features corresponding to the first feature combination to obtain a semantically relevant feature combination when a number of the attention features corresponding to the first feature combination is greater than a first preset threshold; and categorizing the multimedia file using the first computational model.

12. The non-transitory computer-readable storage medium of claim 11, the plurality of feature combinations comprising a third feature combination and determining the third feature combination comprising:

sampling a feature from each feature set in the respective feature sets corresponding to the at least two types of modality information;

linearly mapping the feature selected from each feature set to obtain a plurality of features of a same dimensionality; and combining the plurality of features of a same dimensionality into the third feature combination.

13. The non-transitory computer-readable storage medium of claim 11, the at least two types of modality information comprising image modality information, the steps further comprising:

inputting a plurality of video frames in the image modality information to an image feature extraction model, and extracting respective image features corresponding to the plurality of video frames; and generating a feature set corresponding to the image modality information with the respective image features corresponding to the plurality of video frames.

14. The non-transitory computer-readable storage medium of claim 11, the at least two types of modality information comprising text modality information, the steps further comprising:

inputting a plurality of text words in the text modality information to a text word feature extraction model, and extracting respective text word features corresponding to the plurality of text words; and generating a feature set corresponding to the text modality information with the respective text word features corresponding to the plurality of text words.

15. An apparatus comprising:

a processor; and a storage medium for tangibly storing thereon program logic for execution by the processor, the program logic comprising:

logic, executed by the processor, for determining a plurality of feature combinations based on respective feature sets corresponding to at least two types of modality information in a multimedia file, the multimedia file including a plurality of types of modality information, the types of modality information selected from the group consisting of a text modality, an image modality, and a voice modality, logic, executed by the processor, for fusing a plurality of first features to obtain a first fused feature, logic, executed by the processor, for calculating, using an attention mechanism of a first computational model, probabilities corresponding to a plurality of possible selected results corresponding to the plurality of first features based on the first fused feature, logic, executed by the processor, for determining a target selected result based on the respective probabilities corresponding to the plurality of possible selected results, logic, executed by the processor, for determining attention features corresponding to the first feature combination based on the target selected result, logic, executed by the processor, for combining the attention features corresponding to the first feature combination to obtain a semantically relevant feature combination when a number of the attention features corresponding to the first feature combination is greater than a first preset threshold, and logic, executed by the processor, for categorizing the multimedia file using the first computational model.

16. The apparatus of claim 15, the plurality of feature combinations comprising a third feature combination and the logic for determining the third feature combination comprising:

logic, executed by the processor, for sampling a feature from each feature set in the respective feature sets corresponding to the at least two types of modality information;

logic, executed by the processor, for linearly mapping the feature selected from each feature set to obtain a plurality of features of a same dimensionality; and logic, executed by the processor, for combining the plurality of features of a same dimensionality into the third feature combination.

* * * * *